Figure 6:
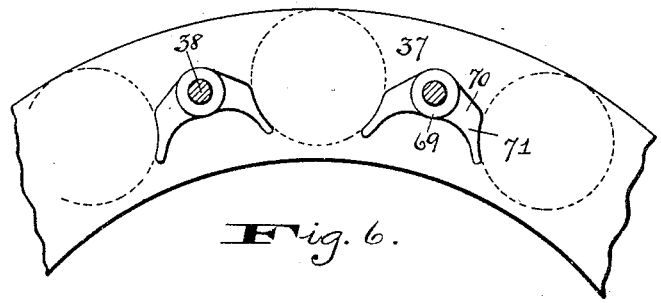

No. 778,623. PATENTED DEC. 27, 1904.
C. H. AYARS.
CAN TESTING MACHINE.
APPLICATION FILED SEPT. 13, 1904.
5 SHEETS—SHEET 1.
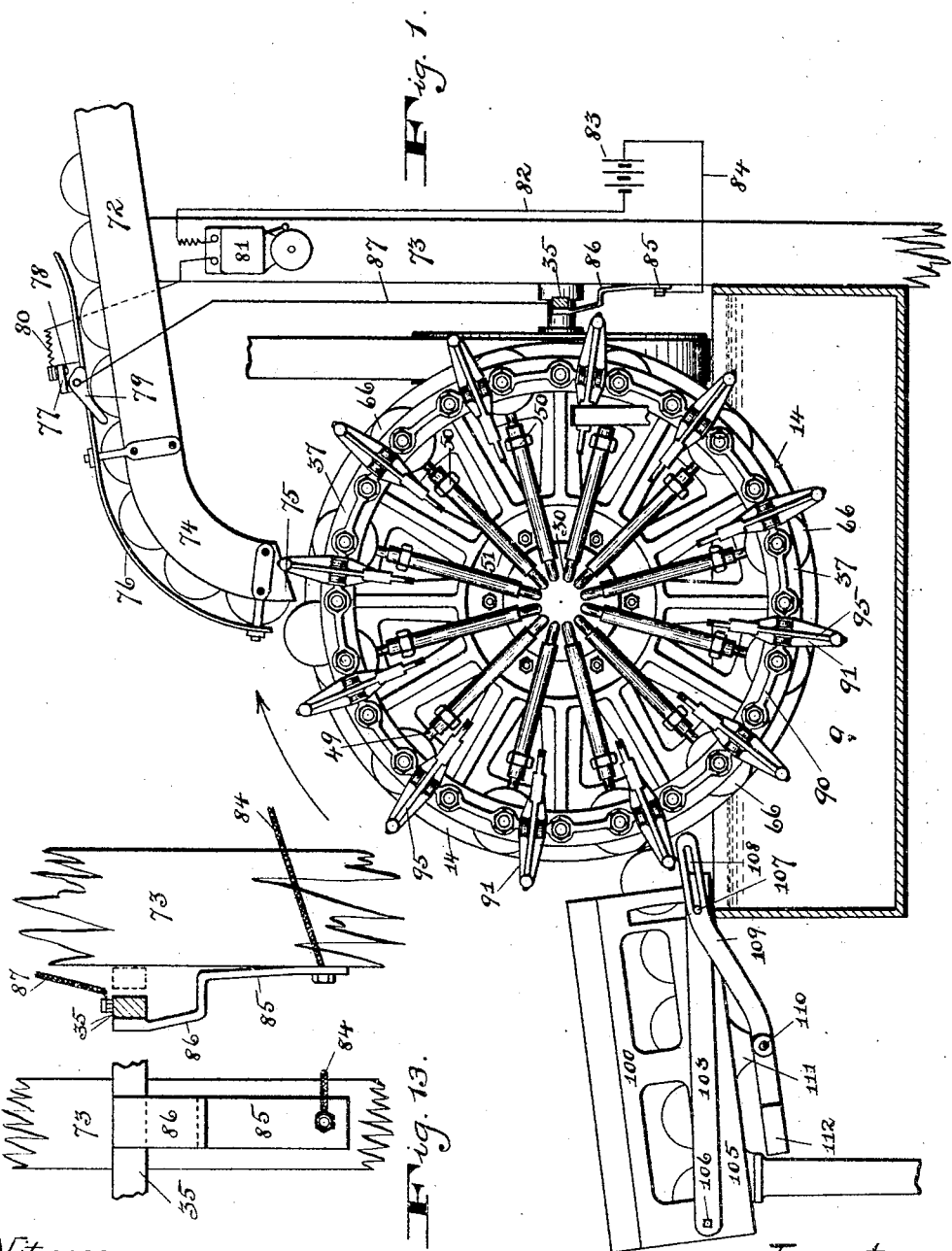
Witnesses.
J. E. Sirich Jr.
G. Ferdinand Vogt.
Inventor.
Charles H. Ayars
By Marw & Co,
Attorneys.

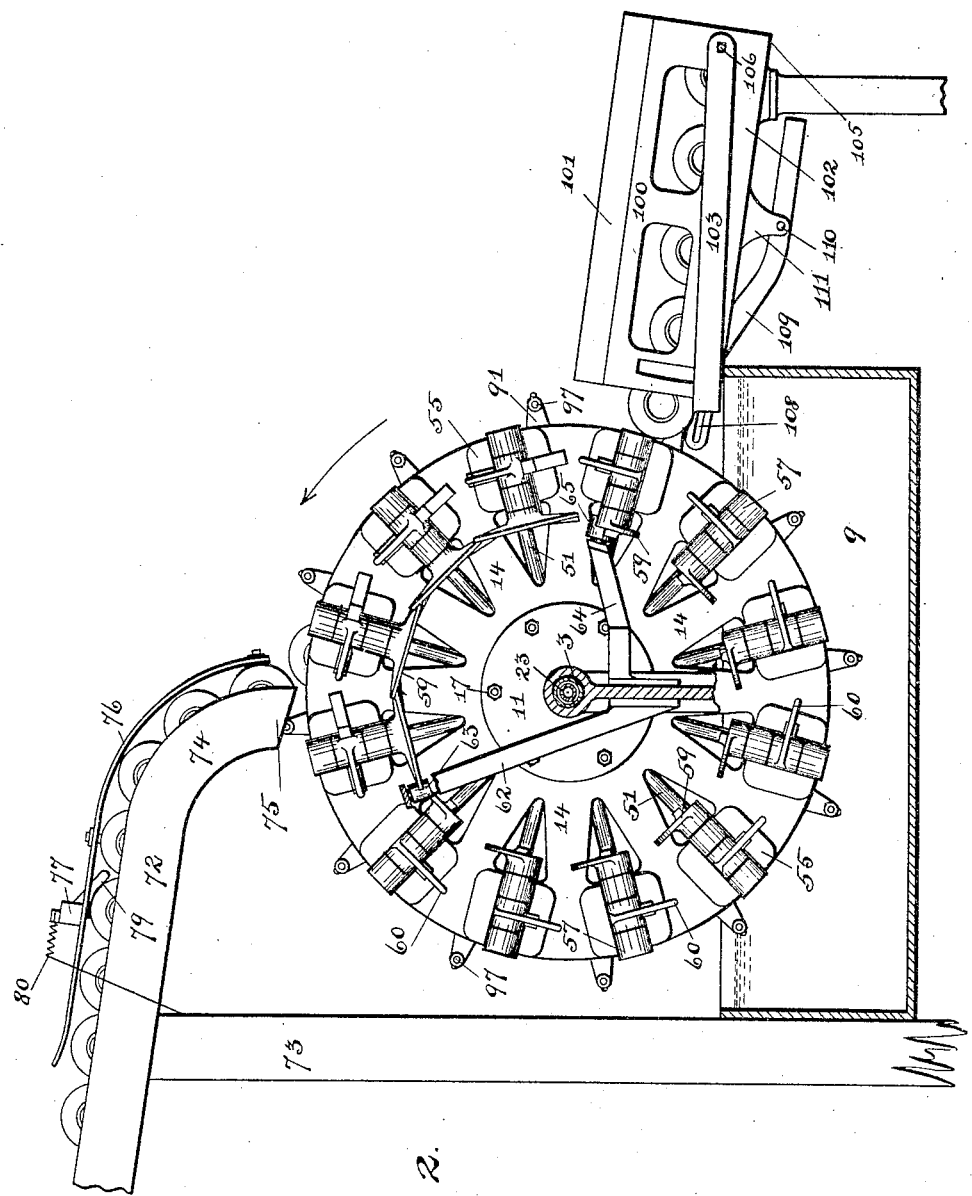

No. 778,623. PATENTED DEC. 27, 1904.
C. H. AYARS.
CAN TESTING MACHINE.
APPLICATION FILED SEPT. 13, 1904.
5 SHEETS—SHEET 3.
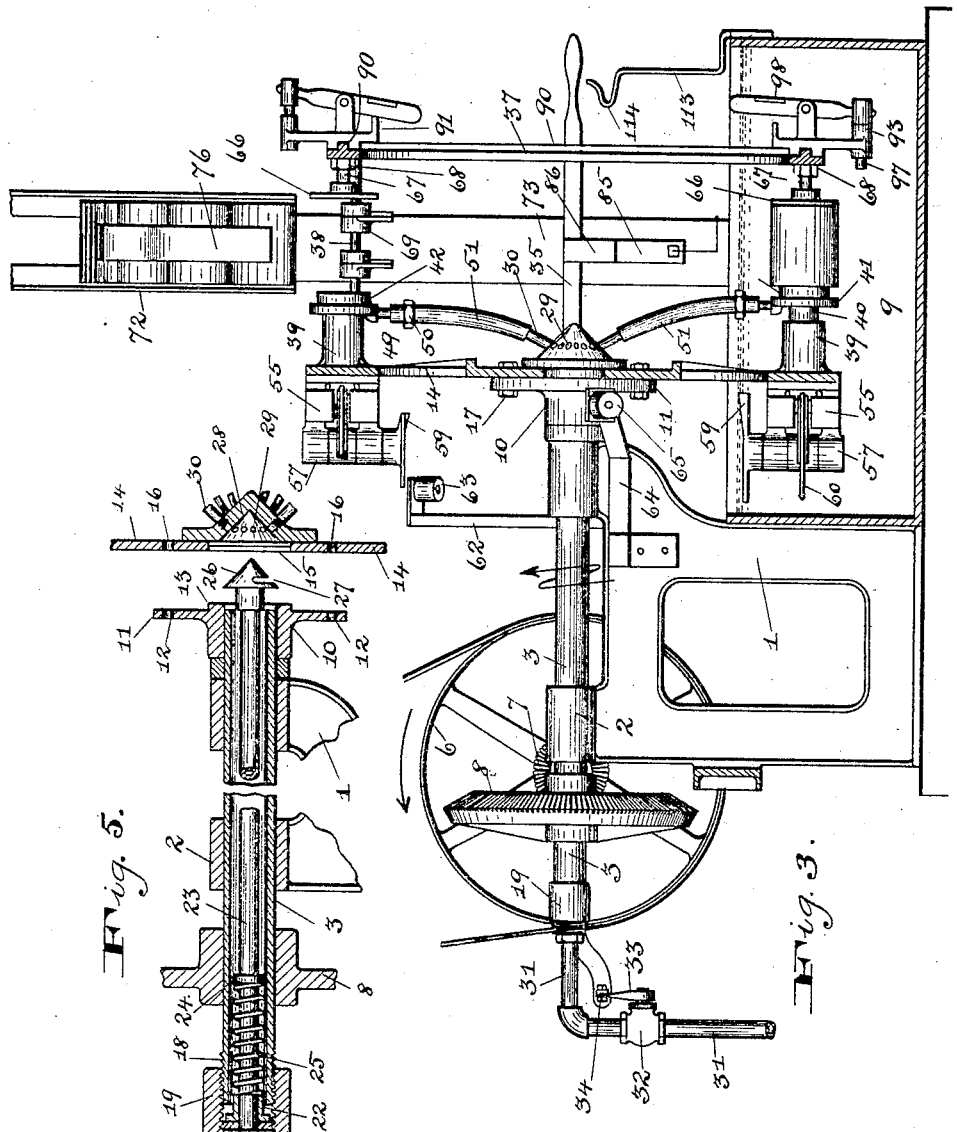
Witnesses.
J. H. Sirich Jr.
G. Ferdinand Vogt
Inventor.
Charles H. Ayars
By Mann & Co,
Attorneys.

No. 778,623. PATENTED DEC. 27, 1904.
C. H. AYARS.
CAN TESTING MACHINE.
APPLICATION FILED SEPT. 13, 1904.

5 SHEETS—SHEET 4.

Witnesses.
J. H. Sirich Jr.
D. Ferdinand Vogt.

Inventor.
Charles H. Ayars
By Mann & Co,
Attorneys.

No. 778,623. PATENTED DEC. 27, 1904.
C. H. AYARS.
CAN TESTING MACHINE.
APPLICATION FILED SEPT. 13, 1904.

5 SHEETS—SHEET 5.

Witnesses.
J. E. Sirich Jr.
D. Ferdinand Vogt

Inventor.
Charles H. Ayars
By Mann & Co,
Attorneys.

No. 778,623.

Patented December 27, 1904.

UNITED STATES PATENT OFFICE.

CHARLES H. AYARS, OF SALEM, NEW JERSEY, ASSIGNOR TO AYARS MACHINE COMPANY, OF SALEM, NEW JERSEY, A CORPORATION OF NEW JERSEY.

CAN-TESTING MACHINE.

SPECIFICATION forming part of Letters Patent No. 778,623, dated December 27, 1904.

Application filed September 13, 1904. Serial No. 224,270.

*To all whom it may concern:*

Be it known that I, CHARLES H. AYARS, a citizen of the United States, residing at Salem, in the county of Salem and State of New Jersey, have invented certain new and useful Improvements in Can-Testing Machines, of which the following is a specification.

This invention relates to can-testing machines of that class in which the sheet-metal cans while held in a carrier are filled with compressed air and submerged in a liquid and the leaky or defective cans being detected by bubbles rising through the liquid caused by the air escaping through the defective portion of the seam or joint. The invention is designed to generally improve the construction of machines of this character, make them more positive in their operation by providing improved devices that can be relied upon to perform their functions, and thereby enable the operator to bestow his entire attention to the few cans actually undergoing test.

One object of the invention is to improve the mechanism for clamping the bodies by providing a simple construction which is positively operated both to clamp and to release the bodies.

Another object of the invention is to provide an improved valve device for directing the air to the clamp devices, whereby the gradual wear of the valve will be automatically cared for.

Another object of the invention is to provide an automatic signal device to notify the operator when the supply of bodies to be tested is low, and thereby avoid the risk of permitting defective bodies to pass through the liquid while his attention is directed to the feed-chute.

Another object is to provide an improved operating-lever, whereby the single operation of the lever to stop the machine will simultaneously actuate a cut-off valve in the air-supply pipe, and thus relieve the bodies remaining in the clamps from constant and injurious pressure.

Another object is to provide an improved construction and arrangement of devices to separate the good bodies from those showing defects.

With these and other objects in view the invention is illustrated in the accompanying drawings, in which—

Figure 7:
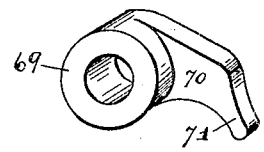
Figure 4:
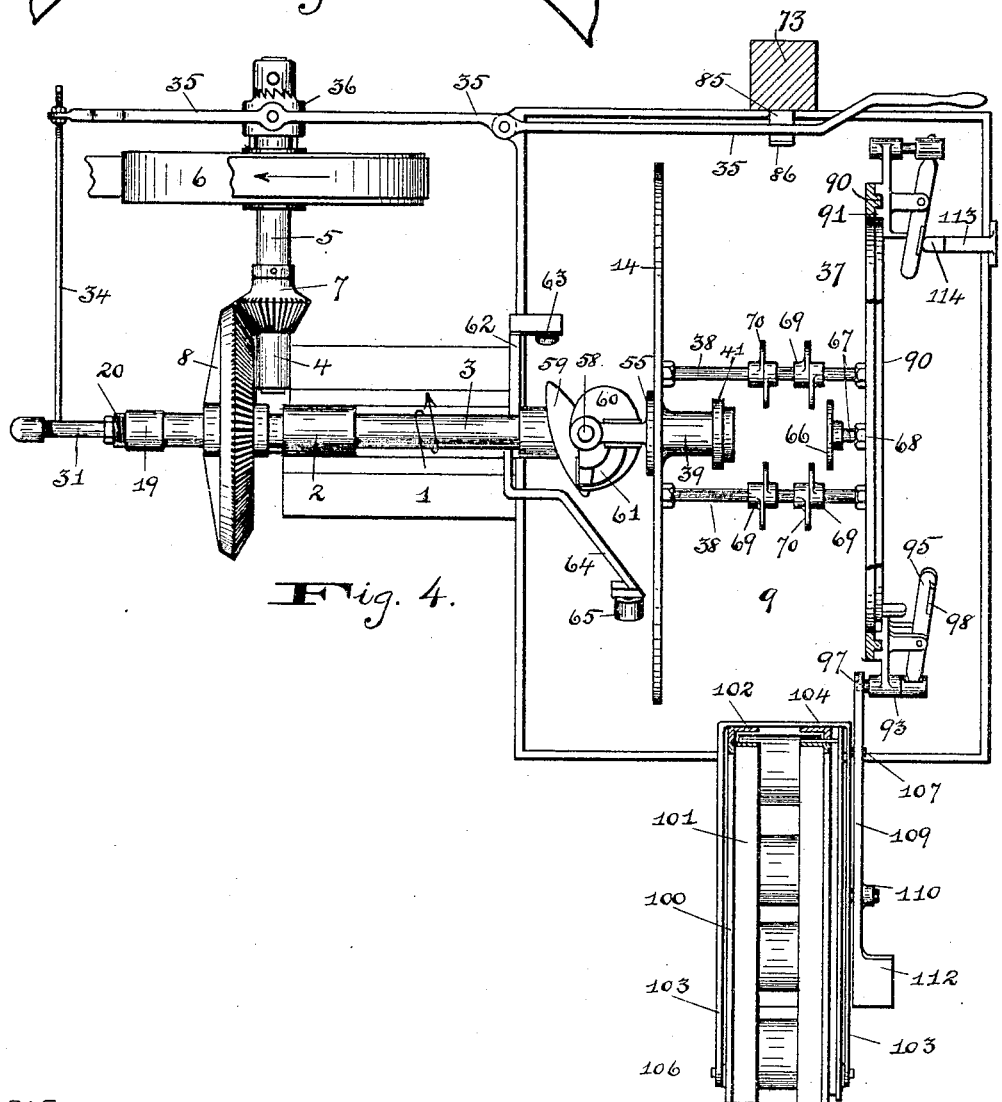
Figure 15:
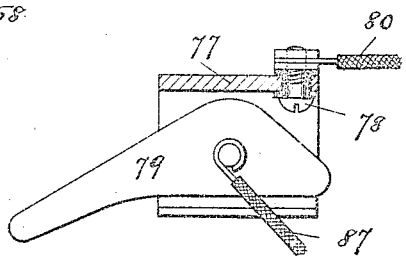
Figure 14:
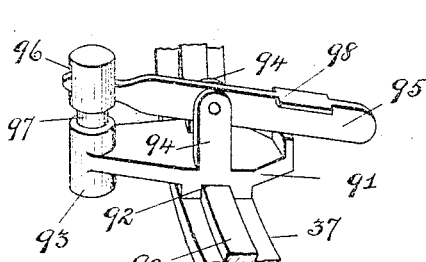
Figure 16:
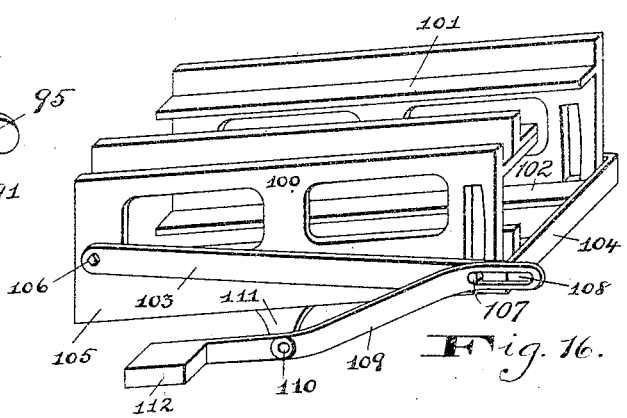

Figure 1 illustrates a side elevation of a machine as viewed from one side and constructed in accordance with the invention and the tank of which is sectioned vertically. Fig. 2 is a similar view as seen from the opposite side of the machine. Fig. 3 shows a sectional elevation of the same, a number of duplicate parts, however, being omitted in order to avoid confusion. Fig. 4 is a sectional plan view of the same, also with a number of duplicate parts removed. Fig. 5 is a vertical longitudinal section through carrier-shaft to illustrate the air-supply tube and valve and the means to keep the valve pressed against its seat. Fig. 6 is a detail of a portion of the outer ring-carrier and the can-centering devices. Fig. 7 is a detail perspective view of one of the can-centering devices. Figs. 8, 9, 10, 11, and 12 are detail views of the can-clamping devices. Fig. 13 illustrates two detail views of the spring-arm in the circuit of the signal device through which the signal is cut out when the machine is stopped by the movement of the operating-lever. Fig. 14 is a perspective detail of one of the brackets and lever mechanism for controlling the discharge of the imperfect cans. Fig. 15 is a detail of the pivoted contact-lever and bracket in the circuit of the signal device. Fig. 16 is a detail of the can-receiver.

Referring to the drawings by numerals, 1 designates a vertical frame provided with bearings 2, which support a hollow shaft 3. The frame is also provided with a bearing 4, which extends in a direction at right angles to said hollow shaft, and this latter bearing carries a driving-shaft 5, on which latter a driving-pulley 6 is mounted. A bevel-pinion 7 is also mounted on said driving-shaft 5 adjacent the bearing 4, and said pinion meshes with a bevel-gear 8 in the hollow shaft 3 and revolves the latter in the direction indicated by the darts. A tank 9 is located at one side of the frame and beneath the inner end of the hollow shaft. The inner end of the hollow shaft 3—that is, the end above the tank—carries a collar 10, which is provided with a circular flange 11. This flange (see particularly Fig. 5) is provided with a plurality of annular perforations 12, and a circular boss 13 projects from one side of said flange.

A circular carrier-plate 14 is provided with a central opening 15, which fits over or receives the boss 13 on the collar 10, and this carrier is also provided with a plurality of perforations 16, which register with the perforations 12 on the flange 11 and through which perforations bolts 17 pass to secure the carrier to the flange of the collar. It will thus be seen that the carrier is secured to the collar and is revolved by means of the hollow shaft 3. The outer end of the hollow shaft is provided with circumferential threads 18, around which one end of a coupling 19 fits. The other end of said coupling receives a plug 20, which is provided with a central passage 21, (indicated by broken lines in Fig. 5,) and on the interior of the coupling and between the plug and hollow shaft is a stuffing-box 22. A tube 23 has position within the hollow shaft 3, and one end of said tube passes through the stuffing-box and enters the plug 20. A collar 24 is secured to the tube, and a spiral spring 25 surrounds the tube and is compressed between the stuffing-box and said collar. The function of this spring will presently be described. The outer end of the tube is provided with a cone-valve 26, having a segmental port 27 in communication with the interior of the tube.

Adjacent the cone-valve 26 and secured to the carrier is a conical valve-seat cap, one side of which has a conical seat 28, which receives the cone-valve 26. This conical cap is provided with a plurality of ports 29, opening at the seat 28, and a pipe 30 leads from each of these ports, as will presently be described.

It will be understood that while the tube 23 is within the hollow shaft it does not revolve therewith; but said tube has a lengthwise or horizontal movement in said hollow shaft and is normally pressed outwardly by the spiral spring toward the carrier, so that the cone-valve 26 will constantly be pressed against the valve-seat 28 and a tight joint constantly maintained.

An air-supply pipe 31 enters the end of the plug 20 and is in communication with the passage 21, leading to the tube 23. A valve 32 is placed in the air-supply pipe and is provided with an operating-arm 33. This arm is pivotally connected to one end of a rod 34, while the other end of said rod is adjustably attached to the outer end of a lever 35 for starting and stopping the machine through the clutch 36 on the shaft 5, as seen in Fig. 4.

It will thus be seen that the operation of the lever to start or stop the machine will operate the valve 32 in the air-pipe. Air may be supplied in any suitable manner.

The rotary carrier, of which the circular plate 14 is a part, also comprises a ring-plate 37, which extends in a direction parallel with and is sustained by the circular plate 14 through the medium of parallel horizontal rods 38, which rigidly connect the two.

Figure 8:
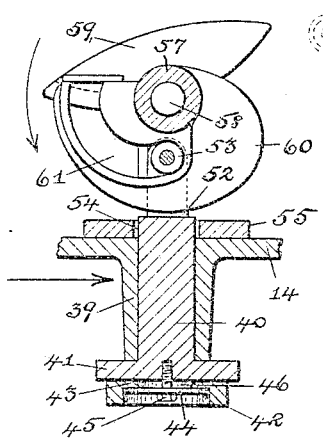
Figure 9:
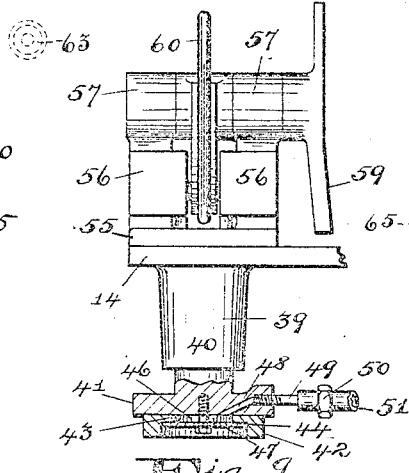
Figure 10:
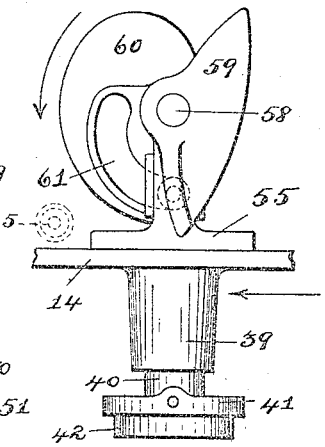
Figure 11:
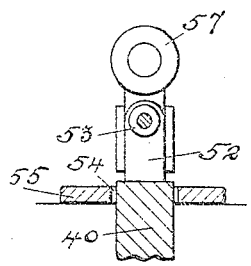
Figure 12:
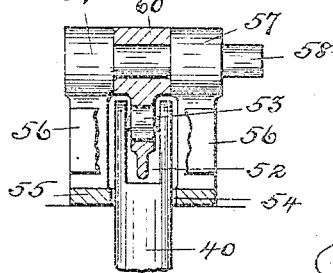

The can to be tested is to be sustained by the rotary carrier and between the circular plate 14 and ring-plate 37, and the means for clamping the can in the carrier will now be described, particular reference being made to Figs. 3, 4, and 8 to 12, inclusive. Projecting from the carrier-plate 14 toward the ring-plate 37 and preferably cast integral with the carrier-plate are a series of tubular or sleeve-like bearings 39. These bearings are located near the periphery of the carrier-plate and are spaced far enough apart to permit of proper individual operation of the devices they are each to carry. In practice the machine is preferably provided with twelve of these bearings; but it is obvious that the number may be varied to suit the capacity required. These bearings each carry a plunger 40, which is of sufficient length to pass through the bearing and project at both ends. The end of the plunger adjacent the end of the bearing is provided with a circular head 41, which latter on its flat vertical face carries a compressible ring 42, with an inwardly-projecting circular flange 43 adjacent said head. A disk 44 fits within the ring 42 and seats on said flange 43, and said disk is secured to said seat by a screw 45 passing through it and into the head 41. By referring to Figs. 8 and 9 it will be noted that a space or chamber 46 is formed between the head and disk 44 and that a port 47 is provided in said disk to open communication from said chamber to the outer side of the disk. This construction will be fully explained in connection with the descriptive operation of the machine. A passage 48 is provided in the head 41, and said passage at one end opens into the chamber 46 and at its other end is in communication with a pipe 49, which enters from the periphery of said head. A suitable coupling 50 on the end of the pipe 49 connects the latter with one end of a flexible tube 51, and the other end of said tube is connected with one of the pipes 30, leading from one of the ports in the conical cap 27 at the center of the carrier-plate 14. It will thus be seen that communication may be established, by means of the cone-valve 26, between the air-tube 23 and the chamber 46 between the disk and head 41. The other end of the plunger which projects at the rear of the carrier-plate 14 is provided with a longitudinal slot 52, in which a roller 53 is mounted. This slotted end of the plunger projects through an opening 54 in a bracket 55, also secured to the carrier-plate 14 directly opposite the bearing 39. The bracket 55 is provided with two arms 56, each of which carries a bearing 57 at its end, and a shaft 58 is supported in said bearings and at one end carries a cam-arm 59, which has position on the inner side of the bracket 55. The function of this cam-arm is to rock the shaft 58 first one way and then back again in each revolution of the carrier, as and for a purpose presently to be described. Rigidly mounted on the shaft 58 and between the two bearings 57 is a cam 60, which is provided with a cam-slot 61. This cam extends through the slot 52 in the end of the plunger 40, and the roller 53, carried by the plunger, fits in the cam-slot 61. It will thus be seen that any movement of the cam 60 will impart a movement to the plunger 40 through the sleeve 39 in a direction toward or away from the shaft 58, and this movement of the plunger will cause a like operation of the head and compressible ring 42. Two devices for operating the cam-arms 59 are provided. One of these devices comprises an arm 62, projecting upwardly from the frame 1 and carrying a roller 63 at its upper end, which is sustained by the said rigid arm in a position to contact with the cam-arms 59 when the latter are in the inoperative position or the position to hold the plunger retracted, as seen in Fig. 8. By reference to Fig. 2 it will be clearly understood how the cam-arms are operated by the roller 63, as in said figure one of the cam-arms is in contact with said roller and is about to be turned to move the plunger outwardly. On the opposite side of the frame 1 and just above the liquid-tank 9 is another stationary arm 64, provided with a roller 65, and this latter roller also has a position to contact with the cam-arm to throw the latter back to its original position to withdraw the plunger. The ring-plate 37, sustained by the carrier through the rods 38, is provided with a plurality of heads 66, which are adjustably supported by means of stems 67 and lock-nuts 68. These heads are carried on the ring-plate, so that each head will have position directly opposite one of the compressible rings 42 of the heads 41 on the carrier-plate, so that the outward movement of each plunger and its head will serve to clamp a can against the head 66, as will presently be fully explained. The rods 38, connecting the carrier-plate 14 and ring-plate 37 and serving to sustain the latter, are also utilized to aid in supporting the cans and centering the same between the movable plunger-head on the carrier-plate and the stationary head on the ring-plate, which latter devices will hereinafter be referred to as the "clamping-heads."

Referring to Figs. 3, 4, 6, and 7, the supporting and centering devices will now be described. It will be noted (see Figs. 4 and 6) that a rod 38 is placed between the adjacent clamping devices and that each rod carries four collars 69 and that each collar is provided with a laterally-projecting arm 70, having a concave seat 71 at its end. Of the four collars on each rod two are placed so that their arms will project at one side of the rod, while the arms of the other two project from the opposite side of said rod. It will thus be seen that two arms from one rod project toward one clamping device and two arms from the next rod project toward the same clamping device, so that each clamping device is to be aided in properly clamping a can by four arms. These arms and collars are rigidly secured on the rods and have no movement independent of the carrier, but are stationary with respect to the latter. The arms are of such length that their concave seats 71 will have position with respect to each other, so that a can when resting on the seats will be supported and centered between the heads of the clamping device, and while thus sustained the plunger is operated, as heretofore described, to move the head 41 toward the stationary head 66 to clamp the can. When thus clamped, the open end of the can will confront the disk 44, so that the interior of the can will be in communication with the air-supply.

The mechanism for delivering the cans to the machine is simple and will now be briefly described. It comprises an inclined chute 72, sustained, preferably at its lower end, by a standard 73, rising vertically adjacent the liquid-tank. The discharge end 74 of said chute is curved downwardly, so that its extreme end 75 will have position directly over and in the same vertical plane as that in which the arms 70 travel with the carrier. A guard-plate 76 is sustained above the curved end of the chute to prevent the cans from overriding each other and becoming displaced. As the carrier slowly revolves the cans from the chute drop between the rods 38 and settle on the arms 70 beneath, and the cans cannot discharge from the chute any faster than the machine will receive them, as the can being discharged will prevent the discharging of the next can until it has dropped into its seat.

In connection with the can-chute I have provided a signal device to give an audible signal to the operator when for any reason the feeding of cans to the chute is discontinued in order that the machine may be stopped and the air simultaneously cut off, as previously described. This signal device comprises a bracket 77, secured on top of the guard-plate 76 and provided with a contact pin or bolt 78. This contact-point is insulated from the bracket in any suitable manner, so that current cannot pass through the bracket to the guard or chute. A contact-lever 79 is pivoted to the bracket 77 and has its lower end hanging pendent from the bracket and in the path of the cans that pass down the chute. A wire 80 is connected at one end to the contact pin or bolt and its other end connected to one of the binding-posts of a bell or other signal device 81. Another wire, 82, extends from the other binding-post of said bell or signal to one side of a battery 83, while a wire 84 leads from the opposite side of the battery to and is in electrical connection with a spring-arm 85, carried on the standard 73. The upper end 86 of this spring-arm is bent laterally away from the standard and projects vertically at the side of the operating-lever 35, so that said lever will have position between the spring-arm and said standard 73. A conductor-wire 87 electrically connects the lever 35 with the pivoted contact-lever 79. In the operation of this signal device it will be noted that when the tester is in operation the lever 35 has a position against the laterally-bent end 86 of the spring-arm 85 and that the circuit is only interrupted between the contact-pin 78 and the pivoted contact-lever 79. This interruption is maintained by the cans in the chute keeping the pendent end of the lever 79 from dropping to a perpendicular position far enough to contact with the pin 78. If for any reason the supply of cans in the chute is discontinued, the moment the last can passes the pivoted lever 79 the latter will drop to a perpendicular position and make contact with the pin 78, and the circuit will be established from one side of the battery 83 through wire 82, through the bell or signal 81, wire 80, to pin 78, and from said pin through lever 79, wire 87, operating-lever 35, spring-arm 85, and wire 84, to the other side of the battery. This circuit will be established as long as the machine continues to operate and the supply of cans in the chute is stopped, and ample notice will be given the operator to stop the machine. In order to interrupt the circuit and stop the bell from ringing continuously until the chute is again sufficiently filled with cans to operate the lever 79, I have provided the spring-arm 85 with the lateral bend 86, which is only in electrical contact with the operating-lever 35 when the latter is in the operated position. When, however, the signal is given and the operator shifts the lever 35 to stop the machine, the movement of the said lever will automatically break or interrupt the circuit by moving the operating-lever away from said spring-arm, as indicated in broken lines in Fig. 13, and by thus interrupting the circuit cut out the operation of the signal. It will thus be seen that the signal is given and maintained automatically until its warning is heeded and is only discontinued when the operator performs his duty by stopping the machine.

After the cans have been fed into the machine and clamped in position to the carrier the air is admitted, as has heretofore been described. If after the cans are submerged any are found to be leaky or otherwise defective, means are provided for discharging said leaky or defective can at one point, while the perfect cans are discharged at a different point. The mechanism for accomplishing this will now be described.

The ring-plate 37 is provided on its outer side with an annular rib 90. A plurality of brackets 91 are carried by the ring-plate, and each of said brackets is provided with a slot 92, which receives the rib of said plate, as clearly seen in Fig. 14. Each bracket is provided with a tubular bearing or sleeve 93 at one end and two lateral arms 94, which latter pivotally support an operating-lever 95. This lever has one end projecting over the sleeve 93 on the bracket, and said end fits into a slot 96 in one end of a bolt 97. The other end of this bolt passes through the sleeve and has movement therein when the lever is rocked. One end of the lever 95 is preferably provided with a flat plate 98 for a purpose presently to be described. It will be understood that each of these brackets is arranged on the ring-plate adjacent one of the clamping-disks and is to control the discharge of the leaky can at the proper point.

A can-receiver 100 is located at one side of the tank 9 and adjacent the periphery of the can-carrier. This receiver has position just above the level of the liquid in the tank and at a point where the cans will roll from the arms 70 immediately the cam-arm 59 is operated by contact with the roller 65 to release the clamp from the cans. It is to be noted that all the clamps are successively released and the cans freed at the same point, no matter whether they are perfect or imperfect; but notwithstanding this fact the perfect cans are discharged at one point and the imperfect ones at another point. The can-receiver comprises a frame having upper and lower inclined trackways 101 and 102, respectively. In the present instance the upper inclined track 101 is designed to receive the imperfect cans and the track 102 to receive the perfect cans. The lower end of the can-receiver is in communication with suitable conveyers or chutes for carrying the cans to any point desired, while the higher end of the lower track is to be guarded, so as to remain open to receive the perfect cans, but be closed to keep out the imperfect cans. The device for controlling the admission of cans to the receiver in the present instance comprises a U-shaped bar having two parallel side arms 103 and a cross-bar 104 at one end. The side arms extend along the vertical wall 105 of the receiver and are pivoted thereto at 106, while the cross-bar 104 extends across the receiving end of the receiver with its upper edge normally flush with or below the higher end of the lower track 102 to permit the cans discharged from the carrier to pass onto the said lower track. One of the side arms is provided with a laterally-projecting pin 107 near its forward end which passes through a slot 108, provided in one end of a lever 109. This lever is pivoted between its ends at 110 to a lug 111 on the receiver, and its lower end is provided with a weight 112, which serves to counterbalance the forward or free ends of the arms and cross-bar. By reference to Figs. 1, 2, and 4 it will be noted that the slotted end of the lever 109 projects beyond the receiving end of the receiver and has position adjacent the inner ends of the sleeves 93 as the latter move in a circular path with the ring-plate. During the testing operation the clamped cans are conveyed by the carrier which revolves slowly and are submerged in the liquid in the tank. As the respective clamping devices enter the tank it is important that the inner ends of the levers 95 are pressed inward toward the ring-plate to insure that the inner ends of the bolts 97 are retracted or moved to their limit in a direction away from the carrier. In order to accomplish this automatically and relieve the operator of that duty, I provide a spring-arm 113, which I prefer to secure to the vertical front wall of the tank and the upper end of which is provided with an inwardly-projecting bend 114, which terminates at a point where it will contact with the flat flange or plate 98 on the inner end of the levers 95 as the latter successively pass said bend and by such contact will automatically push said levers inwardly, and thereby retract the bolt 97. These levers and bolts in the present arrangement of the machine are in no way connected with the clamp devices, and therefore the operation of retracting the bolts may take place at any point between the can-receiver and the submerging-point. When the cans are submerged, the air is admitted, as hereinbefore described, and any leaks will be discovered by the air escaping through the defective seam and causing a series of bubbles to rise through the liquid. The operator on discovering a leak will grasp the inner end of the lever 95 and by pulling it toward him will cause the bolt 97 to be projected inwardly, as seen in Fig. 4. As the bolt moves with the carrier its projecting end in rising from the liquid in the tank will project beneath the slotted end of the lever 109, and its further elevation will raise said lever and also cause the cross-bar 104 and side arms 103 to be elevated. The elevation of the cross-bar is begun just before the clamps release the can, and when the defective can is released the bar 104 will have been elevated sufficiently to prevent the can from passing onto the lower track 102, where the perfect cans are discharged, and the elevation of the cross-bar is continued and the can raised therewith until it registers with the upper track 101, when it will be free to roll off and be conveyed to a point where the defective cans are discharged or repaired.

It will thus be seen that by the present invention the machine will normally discharge all the cans at a given point in the path of revolution of the carrier, but upon the arrival of a leaky or imperfect can at said point the entrance to the track for receiving the perfect cans will be closed and the imperfect can cannot escape and must travel a further distance with the carrier before it will be discharged.

Having thus fully described my invention, what I claim as new, and desire to secure by Letters Patent, is—

1. In a can-testing machine the combination with a liquid-tank, of a carrier; a plurality of can-clamps on said carrier; means for moving the carrier through said tank; means for admitting air to the cans successively after they are clamped; means for starting and stopping the movement of the carrier, and means coacting with the starting and stopping means to admit air when the carrier is started and to cut off the air when the carrier is stopped.

2. In a can-testing machine the combination with a liquid-tank, of a carrier; a plurality of can-clamps on said carrier; means for moving the carrier through said tank; means for supplying air successively to the cans after they are clamped; a valve for controlling the air-supply; means for starting and stopping the carrier, and mechanism connecting the starting and stopping means with the air-controlling valve whereby to operate both simultaneously.

3. In a can-testing machine the combination with a frame, of a hollow shaft supported by said frame; a rotary carrier sustained by said shaft and provided with a central valve-seat; an air-tube within said hollow shaft and provided with a valve which fits against the seat on said carrier; means for constantly pressing the valve against said seat; a plurality of can-clamps on said carrier; means for establishing communication between the can-clamps and the valve, and a tank through which the carrier travels.

4. In a can-testing machine the combination with a frame, of a hollow shaft supported by said frame; a rotary carrier sustained by said shaft and provided with a valve-seat adjacent said hollow shaft; an air-supply tube within said shaft and provided with a valve which fits the seat on the carrier; means whereby the tube and valve may be moved longitudinally within said shaft to keep the valve pressed against the seat; a plurality of can-clamps on said carrier; an air-tube leading from each of said clamps and communication within the valve-seat, and a tank through which the carrier passes.

5. In a can-testing machine the combination with a hollow shaft, of a rotary carrier sustained by said shaft; an air-tube extending through said shaft and carrying a valve at one end adjacent the carrier; an air-supply pipe communicating with said tube and provided with a valve; a plurality of can-clamps on said carrier; means for establishing communication between the air-tube and can-clamps successively; means for starting and stopping the shaft and carrier and means connecting the starting and stopping means with the valve in the air-supply pipe whereby to operate said valve and the starting and stopping means simultaneously.

6. In a can-testing machine the combination with a rotary carrier, of a plurality of brackets sustained by said carrier; a plunger for each of said brackets and having a clamping-head on one end; cams sustained by said brackets and coacting with the other ends of said plungers; cam-arms also sustained by said bracket through which the cams and plungers are operated to clamp the cans, and means for supplying air to the cans through said heads as the carrier revolves.

7. In a can-testing machine the combination with a rotary carrier of a plurality of brackets sustained by said carrier; a plunger movable with respect to each of said brackets and having a clamping-head on one end and a roller on the opposite end adjacent said brackets; a cam carried by each bracket and having a slot which receives the roller on the plunger; a cam-arm also sustained by each bracket and having a fixed relation with respect to the cam on the same bracket; means for rocking said cam-arms to operate the cams and plungers to clamp the cans and means for supplying air to the cans after the cam-arms have been moved to the operative position.

8. In a can-testing machine the combination with a carrier-plate, of a ring-plate; a plurality of rods connecting the carrier and ring plates; a plurality of can-centering devices on each of said rods; a can-clamp on said carrier-plate between each two rods and the centering devices thereon; means for operating said clamps to clamp the cans supported by said centering devices, and means to supply air to the cans after they have been clamped.

9. In a can-testing machine the combination with a carrier, of a plurality of can-clamps on said carrier; operating means for starting and stopping the carrier; a chute for directing the cans to said clamps; a signal device to notify the operator when the supply of cans is stopped and means for cutting out the signal device upon the operation of the means to stop the carrier.

10. In a can-testing machine the combination with a carrier, of a plurality of can-clamps on said carrier; a chute for directing the cans to said clamps; means for supplying air to the cans after they have been clamped; means for starting and stopping the carrier; a signal device to notify the operator when the supply of cans is stopped, and means for simultaneously cutting out the signal device and cutting off the air-supply when the starting and stopping device is moved to bring the carrier to rest.

11. In a can-testing machine the combination with a carrier, of a plurality of can-clamps on said carrier; a chute for directing the cans to said clamps; a lever in the path of the cans in said chute; a signal device; a starting and stopping lever for the carrier; a contact-arm engaging said starting and stopping lever when the latter is in the operating position; an electric circuit including the pivoted lever, signal-device starting and stopping lever and contact-arm, said circuit being rendered operative when the supply of cans in the chute is stopped to give a signal and maintain the signal until the starting and stopping lever is moved to the inoperative position.

12. In a can-testing machine the combination with a carrier, of a plurality of can-clamps on said carrier; means for feeding the cans to said clamps; means for testing the cans while in said clamps; a chute for receiving the perfect cans as they are discharged from the carrier, and means to close the entrance to said chute to prevent the entrance of imperfect cans.

13. In a can-testing machine the combination with a rotary carrier, of a plurality of can-clamps on said carrier; means for testing the cans while in said clamps; means for releasing all the cans from the rotary carrier at a given point, means for conveying the perfect cans from said released point, and means for preventing the escape of the released imperfect cans until the carrier has made a further rotation.

14. In a can-testing machine the combination with a carrier, of a plurality of can-clamps on said carrier; means for testing the cans while in said clamps; two chutes adjacent the carrier for the perfect and imperfect cans respectively; means whereby the perfect cans may enter one of said chutes, and means whereby the entrance to the perfect-can chute may be closed to prevent the entrance of imperfect cans thereto.

15. In a can-testing machine the combination with a carrier, of a plurality of can-clamps on said carrier; means for testing the cans while in said clamps; two chutes adjacent the carrier to receive the perfect and imperfect cans respectively from the carrier; a movable guard at the entrance of one of said chutes; means on the carrier for operating said guard to close the entrance to one of the chutes whereby to prevent the entrance of some of said cans.

16. In a can-testing machine the combination with a carrier, of a plurality of can-clamps on said carrier; means for testing the cans while in said clamps; two chutes adjacent said carrier, one above the other; means for releasing all the cans at a point adjacent the lower chute; to permit the perfect cans to enter said lower chute; and means to close the entrance to said lower chute to prevent the released imperfect cans from entering the latter and to elevate the imperfect cans to the upper chute.

17. In a can-testing machine the combination with a carrier, of a plurality of can-clamps on said carrier; means for testing the cans while in said clamps; two chutes adjacent said carrier and one of which is above the other; means for releasing all the cans at a point adjacent the lower chute; a guard movable across the entrance to said lower chute to prevent the entrance thereto of imperfect cans, and means on the carrier for moving said guard so that the latter will close the entrance to the lower chute and elevate the imperfect cans to the upper chute.

18. In a can-testing machine the combination with a carrier, of a plurality of can-clamps on said carrier; means for testing the cans while in said clamps; two chutes adjacent said carrier and one of which is above the other; means for releasing all the cans at the same point and adjacent the lower chute; a bar near the entrance to the lower chute and normally below the said entrance; lever mechanism connected with said bar, and means on the carrier for engaging said lever mechanism to elevate the latter and the bar to close the entrance to the lower chute.

19. In a can-testing machine the combination with a rotary carrier, of a plurality of can-clamps on said carrier; a movable bolt device on said carrier adjacent each of said clamps; means for testing the cans while in said clamps; a chute for receiving the perfect cans as they are released from said clamps; a guard device at the entrance to said chute, and means coacting with the guard device and operated by the bolt devices on the carrier to close the entrance to said chute and prevent the admission of imperfect cans.

20. In a can-testing machine the combination with a rotary carrier, of a plurality of can-clamps on said carrier; a movable bolt device on said carrier adjacent each of said clamps; means for testing the cans while in said clamps; means for releasing both the perfect and imperfect cans at the same point; two chutes adjacent the carrier, one above the other; a bar at the entrance to the lower chute and movable across said entrance toward the upper chute; a pivoted lever connected with said bar and means for projecting said bolts whereby they may contact with said lever to elevate the bar at the lower chute-entrance for the purpose set forth.

In testimony whereof I affix my signature in presence of two witnesses.

CHARLES H. AYARS.

Witnesses:
J. G. RICHMOND,
HARRY B. WARE.